(No Model.)
C. MARSHALL.
GARDEN IMPLEMENT.
No. 311,503. Patented Feb. 3, 1885.
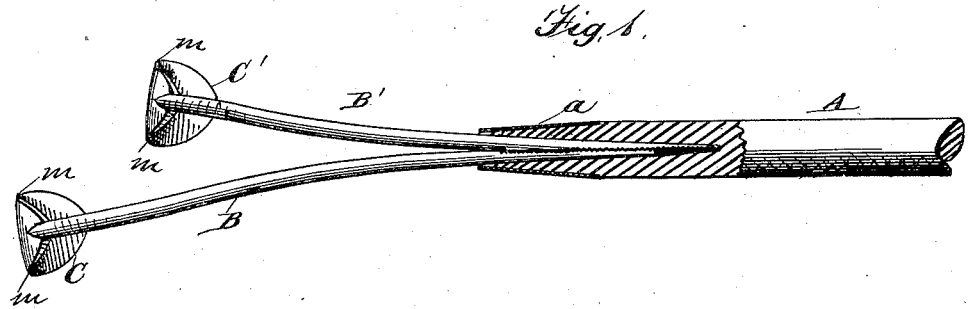
Fig. 1.
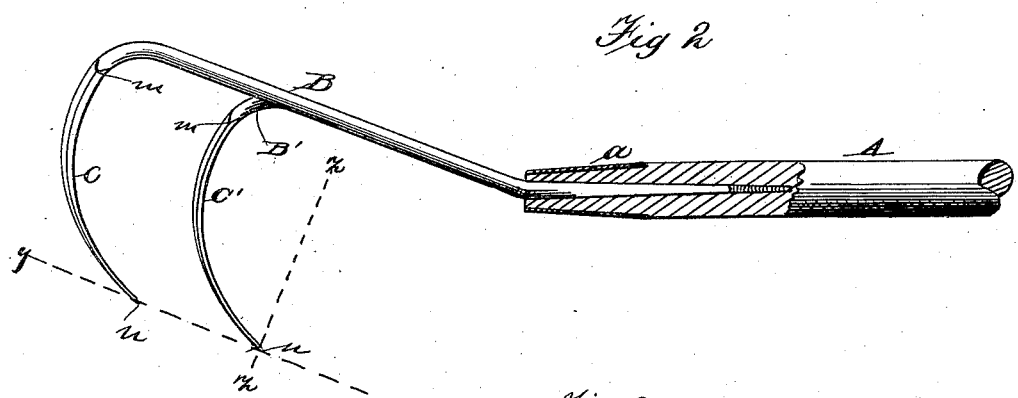
Fig. 2.
Fig. 4.
Fig. 3.
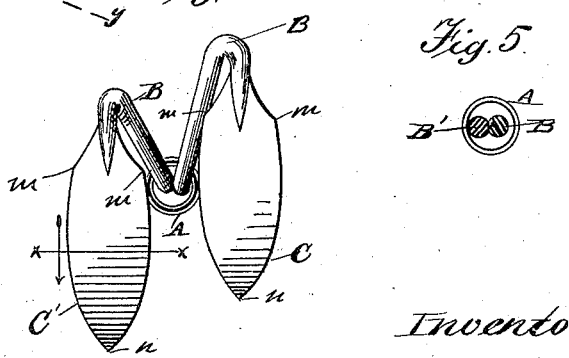
Fig. 5.
attest:
W. H. H. Knight,
N. Bernhard
Inventor:
Calvin Marshall
per Edson Bro's
Attorneys

UNITED STATES PATENT OFFICE.

CALVIN MARSHALL, OF DEXTER, IOWA.

GARDEN IMPLEMENT.

SPECIFICATION forming part of Letters Patent No. 311,503, dated February 3, 1885.

Application filed July 9, 1884. (No model.)

*To all whom it may concern:*

Be it known that I, CALVIN MARSHALL, a citizen of the United States, residing at Dexter, in the county of Dallas and State of Iowa, have invented certain new and useful Improvements in Garden Implements, of which the following is a specification, reference being had therein to the accompanying drawings.

My invention relates to improvements in garden-tools for hand use; and it consists in the provision of a two-bladed hoe having shanks and tangs made integral with the blades, and extending thence to a handle whereby the implement is operated. The shanks are curved upwardly and laterally for the purpose of separating the blades, as well as to give the proper angle to the handle when the points of the blades touch the ground.

The invention particularly relates to the construction and form of the blades, whereby more satisfactory results are attained than can be by hoes having the common flat blade, or those having blades curved from top to bottom and straight between their side edges.

To the accomplishment of the above the invention consists in the construction and arrangement of parts, substantially as hereinafter described, and pointed out in the claims.

In the drawings, Figure 1 represents a plan view of a hoe constructed in accordance with my invention. Fig. 2 is a side elevation thereof. Fig. 3 is an end view. Fig. 4 is a transverse sectional view taken on the line $x$ $x$ of Fig. 3, and Fig. 5 is an end view of the handle, showing the shanks in section.

Similar letters of reference in the several drawings denote like parts.

Referring to the drawings, A designates the handle of any desired length, and provided at its lower end with a ferrule, $a$.

B B' represent the shanks extending from the blades C C' to the end of the handle, and thence formed into tangs $b$ $b'$, that enter an aperture, $a'$, in the handle.

In the drawings I have shown the adjacent faces of the tangs $b$ $b'$ corrugated or roughened, for a purpose hereinafter described. If desired, the tangs $b$ $b'$ may be joined or welded together.

C C' designate the blades, having their side edges curved from points $m$ $m$ downward to the point $n$, as shown. The faces of the blades are curved from top to bottom, the lower points, $n$, being considerably in the rear of the top of the blades. When the points $n$ are on or below the surface of the ground, (represented by the dotted line $y$ $y$,) it will be seen that a draw cutting action upon the roots, weeds, grass, &c., (represented by the dotted line $z$ $z$,) is made by the blades as they are drawn forward.

To facilitate the cutting action above described I make the blades C C' in convexo-convex form in cross-section, as shown in Fig. 4, by which I am enabled to give said blades sharp cutting side edges, as shown, the advantages of which will be readily seen by those skilled in the art to which this invention appertains.

When the tangs are made separate and roughened, as shown, it will be seen that either of the blades may be placed nearer to or farther from the handle, and also that either, in case of breakage, may be removed and a new one substituted therefor.

I am aware that garden-tools having three or more blades have been heretofore made and used, and I therefore do not claim, broadly, a tool having a number of blades; but What I do claim, and desire to secure by Letters Patent, is—

1. A garden-hoe consisting, essentially, of two blades adjustably secured to a handle and at unequal distances therefrom, the blades being curved, substantially as described, and having shanks integral therewith, and extending therefrom to the handle in an oblique direction in a horizontal plane, in combination with a handle, as and for the purposes set forth.

2. In a garden-tool, two blades, C C', curved from top to bottom and convexo-convex in cross-section, as described, said blades provided with shanks B B', having their free ends corrugated or roughened upon their adjacent faces, and extending from the blades at an angle to a handle, A, substantially as described, and for the purpose set forth.

In testimony whereof I affix my signature in presence of two witnesses.

CALVIN MARSHALL.

Witnesses:
J. A. NOEL,
T. C. WALSH.